May 27, 1958  C. M. HUNT, JR  2,836,140
WINDSHIELD HATCHWAY FOR A BOAT
Filed March 2, 1956  3 Sheets-Sheet 1
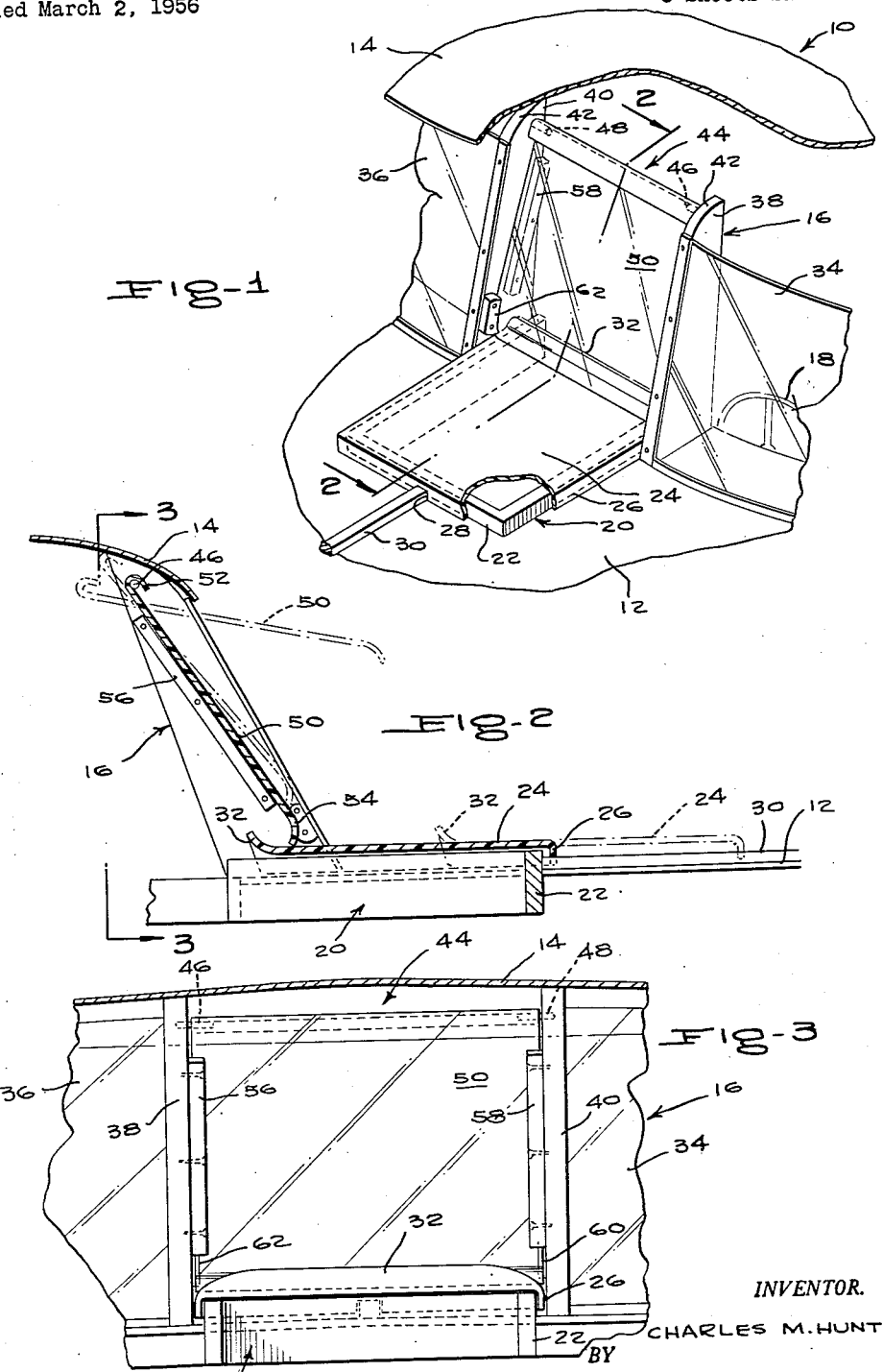
INVENTOR.
CHARLES M. HUNT JR
BY McMorrow, Berman & Davidson
ATTORNEYS

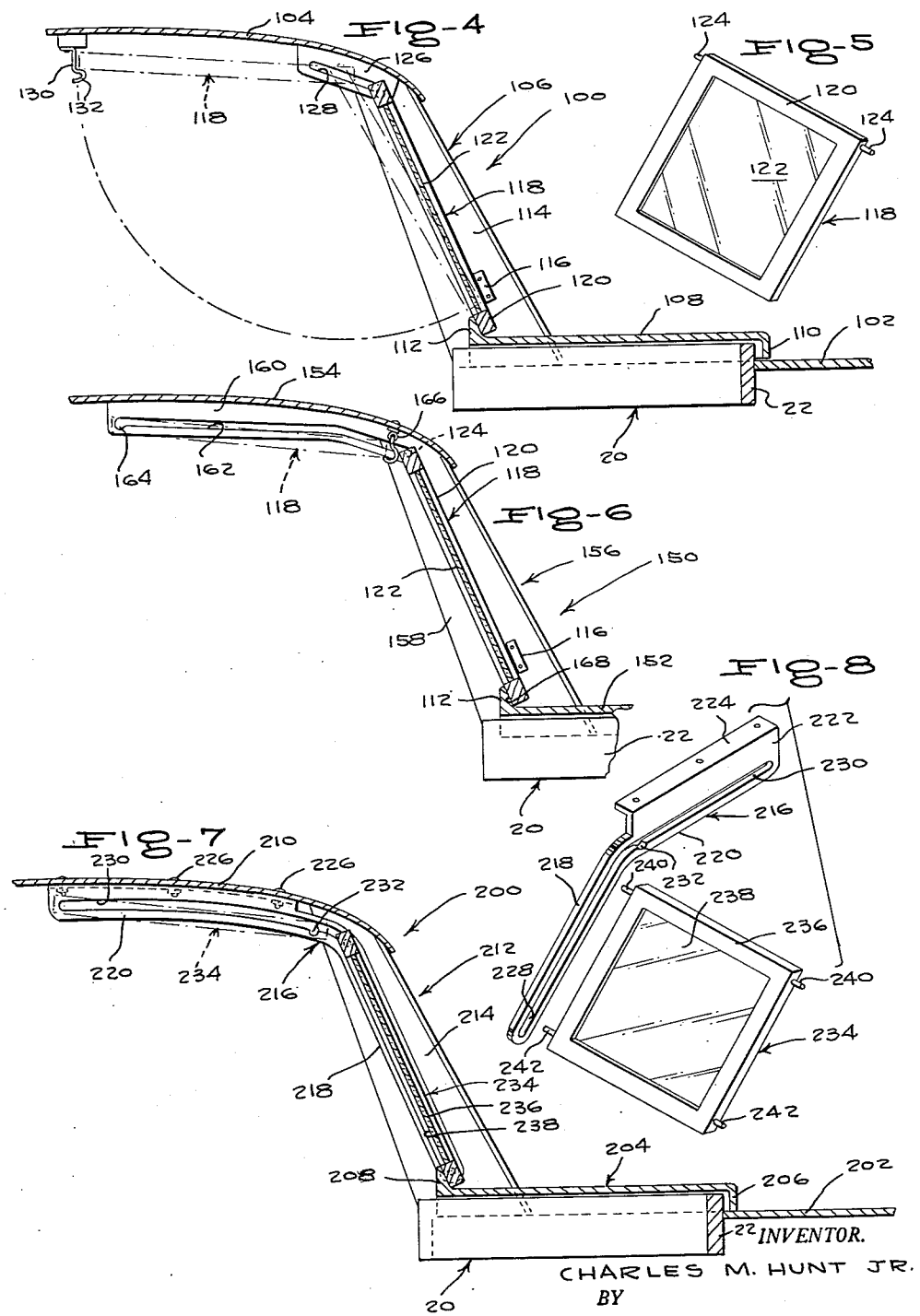

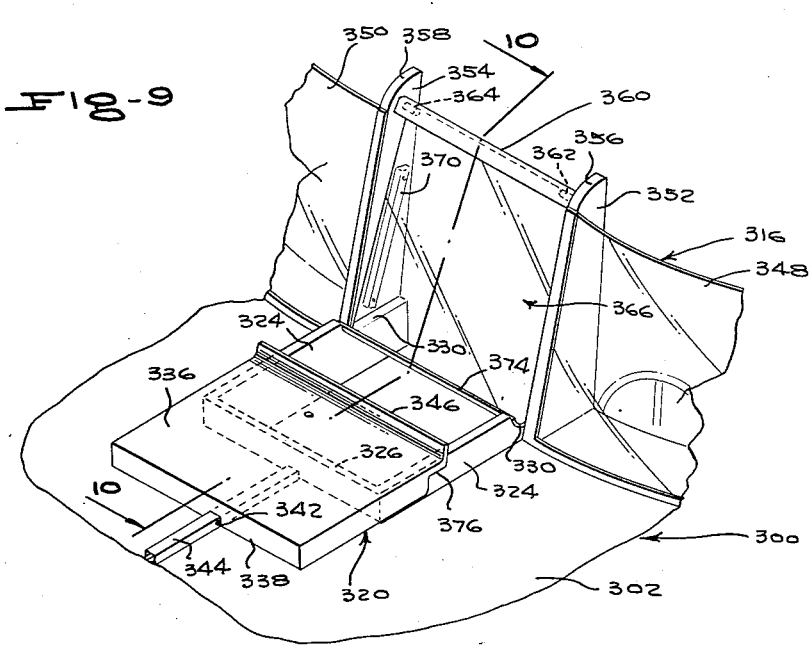
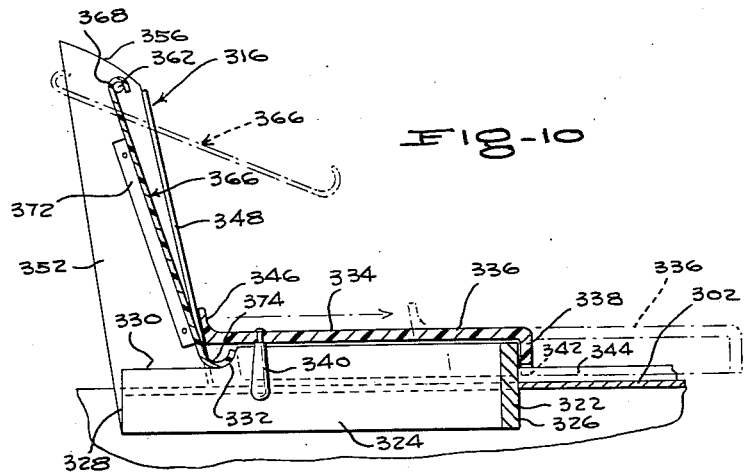

United States Patent Office 2,836,140
Patented May 27, 1958

2,836,140

WINDSHIELD HATCHWAY FOR A BOAT

Charles M. Hunt, Jr., Lake Wales, Fla.

Application March 2, 1956, Serial No. 569,015

10 Claims. (Cl. 114—.5)

This invention relates generally to boat constructions and is more particularly concerned with a novel windshield construction especially usable on small watercraft having a windshield and forehatch, for example, whereby a passage is provided through the windshield and forehatch of such craft permitting ready accessibility to the forward deck portion of said watercraft whereby the pilot of the craft when disposed in the hatchway may have steering control of the craft in the position for facilitating docking, anchoring, fishing, etc., as well as having ready accessibility to the forward deck portion of the boat for the purpose of sun-bathing, observation, etc.

Medium and small watercraft which incorporate a windshield, hatch cover or cabin generally fail to provide ready accessible means for reaching the foredeck of the craft, the anchor generally being stowed thereon, and the foredeck being a desirable position for sun-bathing, fishing, etc. On small watercraft of the character involved, the foredeck is generally reached by means of climbing over the windshield, or by starboard and port walkways adjacent the hatch cover or cabin, negotiation of the same necessitating the complete faculties of an alert and prudent seaman even in calm weather, and on rough water during inclement weather conditions such as negotiations are exceedingly hazardous and inherently dangerous even to the prudent seaman.

The primary object of invention is to overcome the shortcomings of the prior art and provide a boat construction incorporating a passageway or hatchway extending through the windshield or bulkhead of a deckhouse and foredeck portions of the boat which provides ready accessibility to the foredeck of the craft with a minimum of effort and danger to an occupant of the boat.

A further object of invention in conformance with that set forth is to provide a windshield hatchway assembly for watercraft of the character involved which includes displaceable cover members for a windshield passage and hatch opening portion whereby an occupant of the craft will have ready accessibility to the foredeck therof, as well as providing unimpaired visibility for the pilot in conjunction with ready accessibility to the steering controls of the watercraft for the purpose of maneuvering during docking, trolling, etc.

A still further object of invention in conformance with that set forth above is to provide a windshield hatchway assembly of the character involved which is readily and economically manufactured, easily installed, used and maintained, and highly practical, serviceable and utilitarian for the purpose intended.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a fragmentary perspective view of the boat, with portions broken away and shown in section for clarity, having the novel windshield construction incorporated thereon;

Figure 2 is a sectional view taken substantially on line 2—2 of Figure 1, showing in phantom lines the alternate positions of a displaceable cover member for a hatchway opening and a passage portion through the windshield of the boat;

Figure 3 is a sectional view taken substantially on line 3—3 of Figure 2;

Figure 4 is a sectional view similar to Figure 2 showing another embodiment of the novel windshield construction;

Figure 5 is a perspective view of the cover member of the boat windshield utilized in the embodiment of invention of Figure 4;

Figure 6 is a sectional view similar to Figure 2 showing another embodiment of the novel windshield construction;

Figure 7 is a sectional view similar to Figures 2, 4 and 6 showing another embodiment of the novel windshield construction;

Figure 8 is an exploded perspective view showing one of the guide rails and the panel or cover member of the embodiment of invention shown in Figure 7;

Figure 9 is a fragmentary perspective view similar to Figure 1, showing still another embodiment of the novel windshield construction; and Figure 10 is a fragmentary sectional view taken substantially on line 10—10 of Figure 9, showing in phantom lines the manner in which the novel windshield construction of Figure 9 is operated.

Referring to the drawings, in one embodiment, a fragmentary portion of a boat is indicated generally at 10 in Figure 1, said boat including a forward deck portion 12, a canopy or roof 14, and a substantially vertically disposed windshield 16.

The boats involved would be in the class of medium watercraft, generally including a vertical windshield, a closed cabin, three-sided hatch cover, etc., the novel windshield construction being adaptable in any of these and other type boats. If desired the boat may include a conventional steering wheel 18 which will be located relatively close to the central portion of the windshield adjacent the novel windshield construction. In addition, the term windshield is intended to encompass a vertical bulkhead.

The forward deck 12 of the boat includes therein a hatchway portion indicated generally at 20 which opens into the interior of the boat and which comprises a substantially U-shaped frame 22 opening toward the windshield assembly 16 of the boat, said frame having reciprocably disposed thereon a suitable cover member 24 which has a downwardly extending border flange portion 26 overlying the frame 22, the forward portion of said cover having a downwardly opening notch portion 28 disposed upon a guide rail element 30 extending along the longitudinal axis of the forward deck 12. The cover member 24 includes at its opposite transverse edge an upwardly extending relatively arcuate flange portion 32 which aids in guiding water cast upon the windshield on top of the cover member and thence off of the forward deck 12 of the boat. The cover member 24 may be constructed of any suitable material either transparent translucent, etc., and may be made from a suitable plastic or metal such as aluminum for example. The windshield assembly 16 includes a pair of transparent side panels 34 and 36 which may be planar or arcuate as desired, terminating in spaced relationship are vertically extending stanchion members 38 and 40, respectively and being suitably secured thereto by any suitable fastening means. The stanchion members, see Figure 1, have an upper arcuate surface portion 42 conforming more or less to the curvature of the forward portion of the roof 14 or if no roof is mounted on the hull, may be conformed as seen in Figure 9. The stanchion members 38 and 40 define therebetween the windshield passage portion indicated generally at 44, and extending laterally from oppositely disposed inner side surface portions of the stanchion members 38 and 40 are support means such as pin elements 46 and 48, respectively. The windshield passageway portion 44 has pivotally hung in closing relationship relative thereto a cover member indicated generally at 50 which may be a suitable plastic, translucent material, etc., said cover member including an upper transverse reversely bent hook portion 52 which may be disposed in hanging relationship relative to the lateral support pins 46 and 48, the lower edge portion 54 of the cover member 50 being arcuate in cross-section as seen in Figure 2 and extending along the lower edge of said cover member, and being substantially engageable in overlying relationship to a transverse upper surface portion of the cover member 24. The stanchion members 38 and 40 have extending laterally from oppositely disposed vertical inner surface portions elongated support means such as strip elements 56 and 58, respectively, which are engageable with adjacent lower side edge portions of the cover member 50 for supporting the same in the position shown in Figure 2. The elements 56 and 58 are secured to the stanchion members by any suitable fastening means. Also extending laterally on oppositely disposed lower inner surface portions of the stanchion members 38 and 40 are abutment elements 60 and 62, respectively, being secured thereon by means of any suitable fastening means, said abutment elements 60 and 62 engaging outer surface portions of the cover panel or member 50, and if desired may include an arcuate downwardly directed surface portion engageable on the outer surface portion with the lower arcuate end 54 of said cover member.

As seen in Figure 1, the windshield passage and hatch passage are covered by the respective cover members 50 and 24, and when it is desired to have access to the forward deck 12 of the boat, the cover member 24 may be reciprocated to the position shown by the phantom lines of Figure 2 after the cover member 50 also shown by phantom lines in Figure 2 has been displaced in the manner shown therein. Of course, the cover member 50 may be removed entirely from the windshield of the boat thus providing desirable ventilation characteristics for boats which are normally not found in boats incorporating a solid windshield. Thus, there has been disclosed in Figures 1 to 3 a novel windshield assembly which fully conforms with the objects of invention heretofore set forth.

Although not shown, suitable flexible weatherstripping elements may be incorporated with the displaceable cover members 24 and 50. However, such expedients are believed to be obvious, and well known to those skilled in the art, and accordingly it is believed unnecessary to show the same.

Considering Figure 4, there is disclosed a fragmentary portion of a boat indicated generally at 100 including a forward deck portion 102, a roof 104 and a windshield assembly indicated generally at 106. It is to be understood that the embodiment of invention of Figure 4 includes a windshield assembly and vertical stanchion members similar to the embodiment of invention in Figure 1. Furthermore, the forward deck will include a hatchway indicated generally at 20 comprising the frame member 22, said hatchway 20 being covered by an overlying cover member 108 having a downwardly directed flange or skirt portion 110 overlying the frame 22, and including a rear upwardly extending transverse integral abutment strip 112. Included in upwardly extending relationship from the stanchion members 114 (only one being shown) and extending laterally from oppositely directed lower inner surface portions of said stanchion members are abutment elements 116 (only one being shown) for engagement on outer surface portions of a covering or panel member indicated generally at 118. The panel cover member 118 includes a frame 120 having suitably secured therein a transparent panel 122, if preferred, having extending from upper end portions lateral trunnion elements or pins 124.

Suitably secured and extending laterally from oppositely disposed upper inner surface portions of the stanchion members are support means such as track elements 126 (only one being shown) which have a rearwardly extending slot portion 128 therethrough which slidably and pivotally receive trunnion elements or pins 124. The slots 128 are angulated upwardly and rearwardly permitting the lower portion of the frame 120 to be moved away from the transverse abutment strip 112 of the cover member 108 of the abutment elements 116, then permitting the lower portion of said frame to be pivoted into the position shown by the dotted lines of Figure 4, whereafter the lower edge of said frame may be engaged by suitable fastening or retaining means 130 which is suitably secured in depending relationship from a lower surface portion of the top 104. The means 130 has a lower hook portion 132 and is of a resilient material permitting the same to be manually moved out of the way of the frame or cover member 118 permitting the same to be positioned as shown by the phantom lines of Figure 4 when it is desired to open the passageway. It will be noted that the frame 120 overlies the abutment portion 112 of the cover member 108 and serves to retain the same in a closed position when it is desired to keep the hatchway closed.

Considering Figure 6, there is shown a fragmentary portion of a boat indicated generally at 150, the same including a forward deck portion 152, a top member 154, and a novel windshield assembly indicated generally at 156. The windshield assembly 156 incorporates vertically extending spaced stanchion members 158 (only one being shown), such stanchion members incorporating an abutment element 116 which extend toward each other from oppositely disposed inner surface portions thereof. The cover member 152 includes the rear upwardly extending transverse abutment strip 112 similar to that of the embodiment of Figure 4. A cover member or cover panel 118 similar to that of the embodiment of Figure 4 is utilized in the embodiment of Figure 6 incorporating a frame 120 and if preferred a transparent panel 122. The cover member 118 incorporates laterally extending trunnion or pin elements 124 from opposite upper side edge portions.

Suitably secured in depending relationship from the top 154 are a pair of support elements 160 comprising track elements which include rearwardly extending substantially horizontally disposed slot portions 162. It will be noted that only one of the track or support means 160 is shown in Figure 6. The rear end of the slot portion 162 includes an upwardly opening recess portion 164 for receiving therein the pin or trunnion elements 124 when the cover member 118 is moved to the position shown by the dotted lines of Figure 6. Depending from an upper forward portion of the top 154 is a suitable pivoted hook element 166, of a conventional character, which is engageable with the lower edge portion 168 of the cover member 118 when the same is moved to the position shown by the phantom lines of Figure 6. This embodiment of invention functions and operates in the same manner as that of Figure 4, however, when displacing the cover member 118 the same is merely slid along the slot portions 162 of the support means 160. In this regard, it will be noted that in the embodiment of invention of Figures 1 through 3 the cover member 50 may be removed entirely from off the support pins 46 and 48 therefore being suitable for installation on hulls which include only a vertical windshield.

Considering Figures 7 and 8, there is disclosed in Figure 7 a fragmentary portion of a boat indicated generally at 200. The boat includes a forward deck portion 202, a hatchway indicated generally at 20 including a frame member 22. The hatchway 20 which includes the frame 22 has disposed in covering relationship thereto a cover member indicated generally at 204. The cover member 204 includes a depending skirt or flange portion 206 and an upwardly extending rear transverse abutment strip 208, it being noted that the cover member of Figure 7 is of an identical character as that of Figures 4 and 6. The boat of Figure 7 includes a top member 210 and a novel windshield assembly indicated generally at 212. The windshield assembly 212 includes a pair of vertically disposed stanchion members 214 (only one being shown) and extending vertically adjacent oppositely disposed inner surface portions of the stanchion members is an elongated track member indicated generally at 216, said track member 216 including the lower track portion 218 and a rearwardly extending track portion 220, the rear track portion 220 including an upwardly extending portion 222 terminating in a right angular connecting flange portion 224 which is suitably secured to an underside of the top member 210 by means of suitable fastening elements, such as bolt assemblies 226. The track portion 218 has a transverse elongated slot portion 228 extending therethrough which continues as a rearwardly extending slot portion 230, and included adjacent the intersection of the slot portions 228 and 230 is an upwardly opening notch portion 232 engageable with a trunnion or pin element as subsequently will become apparent.

Indicated generally at 234 is a cover or panel member which comprises a frame member 236 having suitably secured therein a suitable transparent panel or window member 238, if desired. Extending laterally from oppositely disposed side edge portions of the frame 236 are spaced trunnion or pin elements 240 adjacent the upper end and 242 adjacent the lower end. The trunnion or pin elements 240 and 242 are received in adjacent rail members or elements 216 thus the cover member 234 is reciprocable in the slots 228 and 230 for being displaced in the position shown by the phantom lines of Figure 7. When the cover member 234 is disposed in a raised position as shown in the phantom lines of Figure 7 the lower trunnion or pin elements 242 will be received in the upwardly opening recesses or notch portions 232 thus retaining the window or cover member in an elevated position. When the cover member is disposed in the position shown by the solid lines of Figure 7 it will cooperate with the upwardly extending abutment strip 208 in the manner in which the cover member 118 cooperates with the abutment strip 112 of the embodiments of invention of Figures 4 and 6.

Referring to Figures 9 and 10, a fragmentary portion of a boat is indicated generally at 300, said boat including a forward deck portion 302 and a substantially vertical windshield 316.

The forward deck 302 of the boat includes therein a hatchway portion indicated generally at 320 which opens into the interior of the boat and which comprises a substantially U-shaped frame 322 opening toward the windshield assembly 316 of the boat, said frame 322 including side portions or leg members 324 (only one being shown in Figure 10) connected to a suitable transverse member 326, said members 324 and 326 being suitably secured in the forward deck portion 302. The leg members 324 include adjacent the rear end portion 328 a notched out portion 330 which curves upwardly at 332 into the upper edge 334 of said leg members for a purpose to subsequently become apparent. The frame 322 has reciprocably disposed thereon a suitable cover member 336 which has a downwardly depending three-sided bordering flange portion 338 normally disposed adjacent the side portions of the leg members 324 and the transverse member 326. The cover member 336 may have secured in depending relationship therefrom a suitable handle member 340 which is accessible from the interior of the boat permitting said cover member 336 to be moved into the dotted line position shown in Figure 10. Provided in the skirt portion 338 of the cover member adjacent the transverse portion 322 of the frame is a downwardly opening notch portion 342, see Figure 9, which is slidably received on a guide rail 344 suitably secured in longitudinally extending relationship on the upper surface of the forward deck 302. The cover member 336 includes at its rear end an upwardly extending transverse flange portion 346.

The windshield assembly 316 includes a pair of transparent side panels 348 and 350 suitably supported on the hull of the boat, said transparent side panels being planar or arcuate as desired, and terminating in spaced relationship at vertically extending stanchion members 352 and 354, respectively. The stanchion members may be curved on their upper edges 356 and 358, respectively, for accommodating thereon a roof or top similar to that shown at 14 in Figure 1. The stanchion members 352 and 354 defined therebetween a windshield passage portion indicated generally at 360 and extending laterally from opposite inner side surface portions of the stanchion members 352 and 354 in oppositely disposed aligned relationship are support means such as laterally extending pin elements 362 and 364, respectively. The windshield passage portion 360 has pivotally hung in closing relationship relative thereto a displaceable cover member indicated generally at 366 which may be constructed from a suitable plastic, translucent material, etc., said cover member including on an upper edge portion thereof a transverse reverse-bend hook portion 368 which is removably and pivotally supported on the pin elements 362 and 364. The stanchion members include on oppositely disposed inner surface portions beneath the pins 362 and 364 longitudinally extending support strip elements 370 and 372 which are engageable on an under surface portion of the removable or displaceable cover member 366. The cover member 366 includes on its lower edge a reverse-bend portion 374 which is engageable with the bend or curved portion 332 of the leg members 324 of the frame 322, and is disposed in underlying intersecting relationship relative to the portion 324 of the cover member 336.

As clearly seen in Figure 9, the reverse bend portion 374 of the cover member is in communication in overlying relationship relative to the forward deck 302 of the boat and thus water deflected by the cover member 366 is cast upon the forward deck of the boat. The flange 338 of the cover member 336 is conveniently cut out at 376, see Figure 9, permitting the aforementioned communication of the deflected water on to the deck, see Figure 10.

The flange 346 normally engages the cover member 366 and prevents the upward pivotal movement thereof or the removal thereof when disposed in the position shown by the solid lines of Figure 10. However, when the cover member 336 is slid forwardly in the position shown by the phantom lines of Figure 10, the cover member 366 may be pivoted upwardly and then removed from the windshield assembly 360.

Thus there has been disclosed a novel windshield construction which fully conforms with the objects of invention heretofore set forth.

Although not shown, other means may be incorporated with the stanchion members for supporting the cover members with the windshield passageways, for example, J-shaped hooks may be pivotally secured in depending oppositely disposed relationship on upper inner surface portions of the stanchion members whereby the trunnion or pin elements of a given cover member may be disposed therein. When this construction is used, the cover member for the passageway through the windshield may be removed in the manner of that shown in Figures 1 through 3, and 9 and 10.

Various positional directional terms such as "forward,"

"upper," etc., are utilized herein and have only a relative connotation to aid in describing the device and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. For use in combination with a boat having a forward deck and a vertically extending windshield, a windshield hatchway assembly comprising a hatch opening portion in the deck communicating with the interior of the boat and opening into the windshield, a windshield passage portion extending vertically through the windshield in alignment and in communication with the hatch opening portion defining a passageway through the windshield and forward deck of the boat, and displaceable cover members supported in closing relationship to the hatch opening portion and windshield passage portions permitting ready accessibility from the interior of the boat to the forward deck of the boat, said displaceable cover members including overlapping edge portions at the intersection of the lower portion of the windshield and the upper surface of the forward deck of the boat.

2. For use in combination with a boat having a forward deck and a vertically extending windshild, a windshield hatchway assembly comprising a hatch opening portion in the deck communicating with the interior of the boat and opening into the windshield, a windshield passage portion extending vertically through the windshield in alignment and in communication with the hatch opening portion defining a passageway through the windshield and forward deck of the boat, and displaceable cover members supported in closing relationship to the hatch opening portion and windshield passage portions permitting ready accessibility from the interior of the boat to the forward deck of the boat, said displaceable cover members including overlapping edge portions at the intersection of the lower portion of the windshield and the upper surface of the forward deck of the boat, the displaceable cover member of the hatch opening portion comprising a hatch cover reciprocably supported on the deck of the boat for movement forward and aft thereon.

3. For use in combination with a boat having a forward deck and a vertically extending windshield, a windshield hatchway assembly comprising a hatch opening portion in the deck communicating with the interior of the boat and opening into the windshield, a windshield passage portion extending vertically through the windshield in alignment and in communication with the hatch opening portion defining a passageway through the windshield and forward deck of the boat, and displaceable cover members supported in closing relationship to the hatch opening portion and windshield passage portions permitting ready accessibility from the interior of the boat to the forward deck of the boat, said displaceable cover members including overlapping edge portions at the intersection of the lower portion of the windshield and the upper surface of the forward deck of the boat, the windshield including a pair of spaced vertical stanchion members extending the height of the windshield on opposite sides of the windshield passage portion, support means extending laterally from oppositely disposed upper end portions of the stanchion members, the displaceable cover member of the windshield passage portion being displaceably supported on said support means, a lower edge portion of the cover member of the windshield passageway portion overlying an upper surface portion of the cover member of the hatchway portion.

4. For use in combination with a boat having a forward deck and a vertically extending windshield, a windshield hatchway assembly comprising a hatch opening portion in the deck communicating with the interior of the boat and opening into the windshield, a windshield passage portion extending vertically through the windshield in alignment and in communication with the hatch opening portion defining a passageway through the windshield and forward deck of the boat, and displaceable cover members supported in closing relationship to the hatch opening portion and windshield passage portions permitting ready accessibility from the interior of the boat to the forward deck of the boat, said displaceable cover members including overlapping edge portions at the intersection of the lower portion of the windshield and the upper surface of the forward deck of the boat, the windshield including a pair of spaced vertical stanchion members extending the height of the windshield on opposite sides of the windshield passage portion, support means extending laterally from oppositely disposed upper end portions of the stanchion members, the displaceable cover member of the windshield passage portion being displaceably supported on said support means, a lower edge portion of the cover member of the windshield passageway portion overlying an upper surface portion of the cover member of the hatchway portion, the support means comprising lateral support portions extending from upper end portions of the stanchion members, the cover member for the windshield passage comprising a removable panel member including an upper transverse reverse-bend hook portion engageable in overlying relationship on the lateral support portions, opposite lower side edge portions of the panel member overlying the support means extending vertically on the inner surface portions of the stanchion members, and abutment means extending laterally from the inner surface portions of the stanchion members and engageable on an upper side edge portion of the panel member.

5. For use in combination with a boat having a forward deck and a vertically extending windshield, a windshield hatchway assembly comprising a hatch opening portion in the deck communicating with the interior of the boat and opening into the windshield, a windshield passage portion extending vertically through the windshield in alignment and in communication with the hatch opening portion defining a passageway through the windshield and forward deck of the boat, and displaceable cover members supported in closing relationship to the hatch opening portion and windshield passage portions permitting ready accessibility from the interior of the boat to the forward deck of the boat, said displaceable cover members including overlapping edge portions at the intersection of the lower portion of the windshield and the upper surface of the forward deck of the boat, the windshield including a pair of spaced vertical stanchion members extending the height of the windshield on opposite sides of the windshield passage portion, support means extending laterally from oppositely disposed upper end portions of the stanchion members, the displaceable cover member of the windshield passage portion being displaceably supported on said support means, a lower edge portion of the cover member of the windshield passageway portion overlying an upper surface portion of the cover member of the hatchway portion, the support means comprising a pair of oppositely disposed track elements extending laterally from the inner surface portions of the stanchion members, the cover member for the windshield passage portion including oppositely directed trunnion elements extending from opposite side edge portions thereof, the trunnion elements being slidably and pivotally retained in the track elements, and abutment elements extending laterally from opposed inner surface portions of the stanchion members and engageable on upper surface portions of the cover member.

6. For use in combination with a boat having a forward deck and a vertically extending windshield, a windshield hatchway assembly comprising a hatch opening portion in the deck communicating with the interior of the boat and opening into the windshield, a windshield passage portion extending vertically through the windshield in alignment and in communication with the hatch opening portion defining a passageway through the windshield and forward deck of the boat, and displaceable cover members supported in closing relationship to the hatch opening portion and windshield passage portions permitting ready accessibility from the interior of the boat to the forward deck of the boat, said displaceable cover members including overlapping edge portions at the intersection of the lower portion of the windshield and the upper surface of the forward deck of the boat, the windshield including a pair of spaced vertical stanchion members extending the height of the windshield on opposite sides of the windshield passage portion, support means extending laterally from oppositely disposed upper end portions of the stanchion members, the displaceable cover member of the windshield passage portion being displaceably supported on said support means, a lower edge portion of the cover member of the windshield passageway portion overlying an upper surface portion of the cover member of the hatchway portion, the support means comprising a pair of oppositely disposed track elements extending laterally from the inner surface portions of the stanchion members, the cover member for the windshield passage portion including oppositely directed trunnion elements extending from opposite side edge portions thereof, the trunnion elements being slidably and pivotally retained in the track elements, and abutment elements extending laterally from opposed inner surface portions of the stanchion members and engageable on upper surface portions of the cover member, and including fastening means secured on an elevated portion of the boat detachably engaging the cover member for retaining said cover member in an elevated position rearwardly of the windshield passage portion.

7. For use in combination with a boat having a forward deck and a vertically extending windshield, a windshield hatchway assembly comprising a hatch opening portion in the deck communicating with the interior of the boat and opening into the windshield, a windshield passage portion extending vertically through the windshield in alignment and in communication with the hatch opening portion defining a passageway through the windshield and forward deck of the boat, and displaceable cover members supported in closing relationship to the hatch opening portion and windshield passage portions permitting ready accessibility from the interior of the boat to the forward deck of the boat, said displaceable cover members including overlapping edge portions at the intersection of the lower portion of the windshield and the upper surface of the forward deck of the boat, the windshield including a pair of spaced vertical stanchion members extending the height of the windshield on opposite sides of the windshield passage portion, support means extending laterally from oppositely disposed upper end portions of the stanchion members, the displaceable cover member of the windshield passage portion being displaceably supported on said support means, a lower edge portion of the cover member of the windshield passageway portion overlying an upper surface portion of the cover member of the hatchway portion, the support means comprising a pair of oppositely disposed track elements extending laterally from the inner surface portions of the stanchion members, the cover member for the windshield passage portion including oppositely directed trunnion elements extending from opposite side edge portions thereof, the trunnion elements being slidably and pivotally retained in the track elements, and abutment elements extending laterally from opposed inner surface portions of the stanchion members and engageable on upper surface portions of the cover member, said track elements extending away from the stanchion members, the track elements including an upwardly-opening notch portion engageable with one of the trunnion elements on the cover member.

8. For use in combination with a boat having a forward deck and a vertically extending windshield, a windshield hatchway assembly comprising a hatch opening portion in the deck communicating with the interior of the boat and opening into the windshield, a windshield passage portion extending vertically through the windshield in alignment and in communication with the hatch opening portion defining a passageway through the windshield and forward deck of the boat, and displaceable cover members supported in closing relationship to the hatch portion and windshield passage portions permitting ready accessibility from the interior of the boat to the forward deck of the boat, said displacement cover members including overlapping edge portions at the intersection of the lower portion of the windshield and the upper surface of the forward deck of the boat, the windshield including a pair of spaced vertical stanchion members extending the height of the windshield on opposite sides of the windshield passage portions, support means extending laterally from oppositely disposed upper end portions of the stanchion members, the displaceable cover member of the windshield passage portion being displaceably supported on said support means, a lower edge portion of the cover member of the windshield passageway portion overlying an upper surface portion of the cover member of the hatchway portion, the support means comprising a pair of oppositely disposed track elements extending laterally from the inner surface portions of the stanchion members, the cover member for the windshield passage portion including oppositely directed trunnion elements extending from opposite side edge portions thereof, the trunnion elements being slidably and pivotally retained in the track elements, and abutment elements extending laterally from opposed inner surface portions of the stanchion members and engageable on upper surface portions of the cover member, the track elements extending laterally along the length of the stanchion members from oppositely disposed inner surface portions thereof, the track elements including an angulated upper end portion extending rearwardly away from the windshield passage portion, the trunnion elements comprising spaced pairs of pins extending laterally from the cover member and slidably received on the track elements, the track elements including an upwardly opening notch portion engageable with one of the pins for retaining the cover member in a rearwardly disposed elevated position relative to the windshield passage portion.

9. For use in combination with a boat having a forward deck and a vertically extending windshield, or the like, a windshield hatchway assembly comprising a hatch opening portion in the deck communicating with the interior of the boat and opening into the windshield, a windshield passage portion extending vertically through the windshield in alignment and in communication with the hatch opening portion defining a passageway through the windshield and forward deck of the boat, and displaceable cover members supported in closing relationship to the hatch opening portion and windshield passage portions permitting ready assessibility from the interior of the boat to the forward deck of the boat, said displaceable cover members including overlapping edge portions at the intersection of the lower portion of the windshield and the upper surface of the forward deck of the boat, the windshield including a pair of spaced vertical stanchion members extending the height of the windshield on opposite sides of the windshield passage portion, support means extending laterally from oppositely disposed upper end portions of the stanchion members, the displaceable cover member of the windshield passage portion being displaceably supported on said support means.

10. For use in combination with a boat having a forward deck and a vertically extending windshield, a windshield hatchway assembly comprising a hatch opening portion in the deck communicating with the interior of the boat and opening into the windshield, a windshield passage portion extending vertically through the windshield in alignment and in communication with the hatch opening portion defining a passageway through the windshield and forward deck of the boat, and displaceable cover members supported in closing relationship to the hatch opening portion and windshield passage portions permitting ready assessibility from the interior of the boat to the forward deck of the boat, said displaceable cover members including overlapping edge portions at the intersection of the lower portion of the windshield and the upper surface of the forward deck of the boat, the windshield including a pair of spaced vertical stanchion members extending the height of the windshield on opposite sides of the windshield passage portion, support means extending laterally from oppositely disposed upper end portions of the stanchion members, the displaceable cover member of the windshield passage portion being displaceably supported on said support means, the displaceable cover member of the windshield passage portion including an upper reverse-bend portion removably supported on the support means of the stanchion members, the lower edge portion of the displaceable cover member comprising a reverse-bend portion extending transversely between the stanchion members in underlying relationship relative to the adjacent edge of the displaceable cover member of the hatch opening portion, the reverse-bend portion on the displaceable cover member of the windshield passage portion being in vertical spaced relationship relative to an upper surface portion of the forward deck of the boat for deflecting water thereon cast on the last-mentioned cover member.

References Cited in the file of this patent
UNITED STATES PATENTS
989,702   Gurney _____ Apr. 18, 1911